United States Patent [19]
Kowalski

[11] 3,749,492
[45] July 31, 1973

[54] INTERFEROMETRIC HYPSOCLINE GENERATOR

[75] Inventor: Daniel C. Kowalski, Wyandotte, Mich.

[73] Assignee: The Bendix Corporation, Southfield, Mich.

[22] Filed: June 22, 1971

[21] Appl. No.: 155,459

[52] U.S. Cl.................. 356/2, 356/106 R, 356/109
[51] Int. Cl. ......................... G01c 11/04, G01b 9/02
[58] Field of Search..................... 356/2, 106 R, 109

[56] References Cited
UNITED STATES PATENTS
3,603,682   9/1971   Sheridon et al......................... 356/2

Primary Examiner—Ronald L. Wibert
Assistant Examiner—F. L. Evans
Attorney—John S. Bell et al.

[57] ABSTRACT

A hypsocline or interference pattern having a shape and position representing the shape and position of an isoelevation area in a scene is produced from two phototransparent stereo images by directing mutually coherent collimated laser beams to strike the two stereo images. The images diffract the beams and thus transmit image information to the laser beams. The diffracted beams are directed to intersect, and any portions of the two intersecting beams representing the same area in the scene that are in registration with each other provide an interference pattern comprising alternate light and dark lines. The interference pattern has the shape and position of the represented area in the scene. The images are oriented with respect to each other so that the patterns produced represent isoelevation areas in the scene. A relative movement is provided between one stereo image and the beam striking that image to alter the portions in registration and thus provide different interference patterns representing areas at different elevations. The D.C. spatial frequency components are removed from the diffracted beams in order to maximize the difference between the interference patterns representing isoelevation areas and background signals surrounding those interference patterns.

26 Claims, 6 Drawing Figures

FIG. 1

INVENTOR
DANIEL C. KOWALSKI

BY *John L. Bell*

ATTORNEY

PATENTED JUL 31 1973 3,749,492

INVENTOR
DANIEL C. KOWALSKI
BY John I. Bell
ATTORNEY

INTERFEROMETRIC HYPSOCLINE GENERATOR

CONFIRMATORY LICENSE TO UNITED STATES GOVERNMENT

The invention herein described was made in the course of a contract with the Department of the Air Force.

BACKGROUND OF THE INVENTION

1. Field of the Invention

Photogrammetry, and more particularly, the determination of the elevation of areas in a scene from stereo images of that scene.

2. Brief Description of the Prior Art

It is well known that two stereo images of a scene, or in other words, two images of the scene taken from different vantage points, can be superimposed on each other so that the portions of the stereo images representing all areas in the scene at one elevation will be in registration with each other, and so that all portions of the stereo images representing areas in the scene at all other elevations will not be in registration. That is, all conjugate image points representing areas in the scene at one elevation will be precisely aligned with each other, and all other conjugate points of the stereo images will be slightly offset from each other. The portions of the two stereo images that are not in registration with each other tend to cancel each other to produce a gray, blurred background signal. The areas in registration do not cancel each other and thus provide an output that is generally of greater intensity than the other portions of the image of the scene produced by the superimposed stereo images.

One known device provides a contour map of a scene by superimposing two stereo images onto each other so that all points at one elevation are in registration and recording the image produced by the superimposed stereo images. The two stereo images are then moved relative to each other to bring all points at another elevation into registration and a recording is made of the resulting image. A contour map is produced by forming images representing the areas at all elevations of interest and by then forming a composite of each of the recorded images. One drawback of this device is that it is very difficult to automatically identify and record the portions of the two stereo images that are in registration with each other because the difference in intensity between areas of the stereo images in registration with each other and those not in registration may be very small. That is, the intensity of various portions of the image produced by the superimposition of the stereo images depends on the image detail or nature of the scene at various portions of the stereo images. It is thus possible with some images for areas of the superimposed stereo images that are not in registration to produce a more intense signal than those that are in registration.

SUMMARY OF THE INVENTION

The subject invention comprises a system for providing an output image having a portion that represents one isoelevation area in the scene and that can be easily distinguished from all other portions of the output image. Several systems or preferred embodiments are illustrated herein that provide an output image that includes an interference pattern having an outline and position representing the outline and position of an isoelevation area in a scene. The interference pattern is surrounded by a gray background signal and can be easily distinguished from that background signal. The illustrated embodiments provide the interference pattern by directing beams of mutually coherent, collimated laer light to strike two transparent stereo images of a scene. The images diffract the beams and thus transmit the image information to the laser beams. The diffracted beams are directed to intersect. The portions of the two intersecting beams that represent the same areas in the scene and that are in registration with each other provide an interference pattern having an outline representing the outline of the represented area. The portions of the two intersecting beams that are not in registration with each other provide a gray background signal. The stereo images are positioned with respect to the beams so that the interference pattern produced by the intersecting, diffracted beams represents the entire area in the scene at one elevation. Different patterns representing areas at different elevations are produced by moving one stereo image perpendicular to the beams striking that stereo image in order to provide registration between portions of the intersecting beams representing different areas in the scene at different elevations.

The invention also encompasses means for removing at least one spatial frequency component from the two stereo images, or from patterns representing those images, in order to maximize the difference between the portions of the output image representing an isoelevation area in the scene and the portions of that image representing other areas in the scene. The systems illustrated herein include means for removing the D.C. spatial frequency components from the diffracted laser beams. As used herein, the term "D.C. spatial frequency component" refers to that spatial frequency component having zero line pairs per millimeter. The term "spatial frequency" is a measure of image detail and is customarily measured in line pairs per millimeter. The D.C. spatial frequency component provides equal contributions to all portions of the output image and thus obscures the difference between the portions of the output image representing the selected isoelevation area and the other portions of the output image. In the systems illustrated herein, spherical lenses are positioned to receive the diffracted laser beams representing the two stereo images and to separate the spatial frequency components of those beams by forming the Fourier transform of those beams. Spatial filters are positioned downstream from the spherical lenses to block the propagation of the D.C. spatial frequency component and thus eliminate that component from the diffracted beams. The separation between the remaining spatial frequency components is then eliminated by forming a second Fourier transform on the diffracted beams. This second Fourier transform distributes the image information across the beams in an appropriate form so that conjugate areas of the intersecting beams in registration with each other will provide an interference pattern that is easily distinguished from the background signal.

The interference patterns produced by the above-described systems comprise perspective representations of isoelevation areas in a scene. The invention therefore also includes a lens system for magnifying and minifying various patterns produced to convert the perspective representations to orthographic representations. In order to provide this conversion, all output patterns representing areas in the scene at elevations less than a preselected reference elevation are magnified by amounts proportional to the differences between those lesser elevations and the reference elevation. Similarly, all output patterns representing areas in the scene at elevations greater than the reference elevation are demagnified or minified by amounts proportional to the differences between those greater elevations and the reference elevation. The difference in elevation between the elevation of any selected area in the scene and a reference elevation is proportional to the relative displacement of one of the stereo images with respect to the other between the position of that stereo image at which a pattern is produced representing the area at the reference elevation and the position of that stereo image at which a pattern is produced representing the area at the selected elevation. The lens system thus converts perpsective representations to orthographic representations by magnifying or demagnifying those perpsective representations by amounts determined by the relative displacement between the stereo images required to produce each pattern.

The invention also comprises means for providing a permanent record of patterns representing the areas of the scene at various elevations. In one embodiment illustrated herein, the apparatus for providing this permanent record comprises apparatus for scanning a photodetector across the output image. The portion of the output image representing an isoelevation area in the scene is caused to flash on and off at a predetermined frequency while the background signal is held constant. The photodetector provides an electric output signal indicating the temperal frequency of received optic signals. The photodetector is scanned across the output image and the position of the photodetector is recorded to provide a permanent record of the contour of isoelevation areas in the scene whenever a signal having the predetermined temperal frequency is detected.

The invention also encompasses apparatus for facilitating identification of interference patterns representing isoelevation areas in a scene. This apparatus includes means for adjusting the spatial frequency of the interference pattern in order to maximize the difference between the interference pattern and the background signal.

BRIEF DESCRIPTION OF THE DRAWINGS

Further objects, features, and advantages of the invention defined by the appended claims, will become apparent from a consideration of the following description and the accompanying drawings in which:

DETAILED DESCRIPTION OF THE PREFERRED EMBODIMENTS

Figure 1:
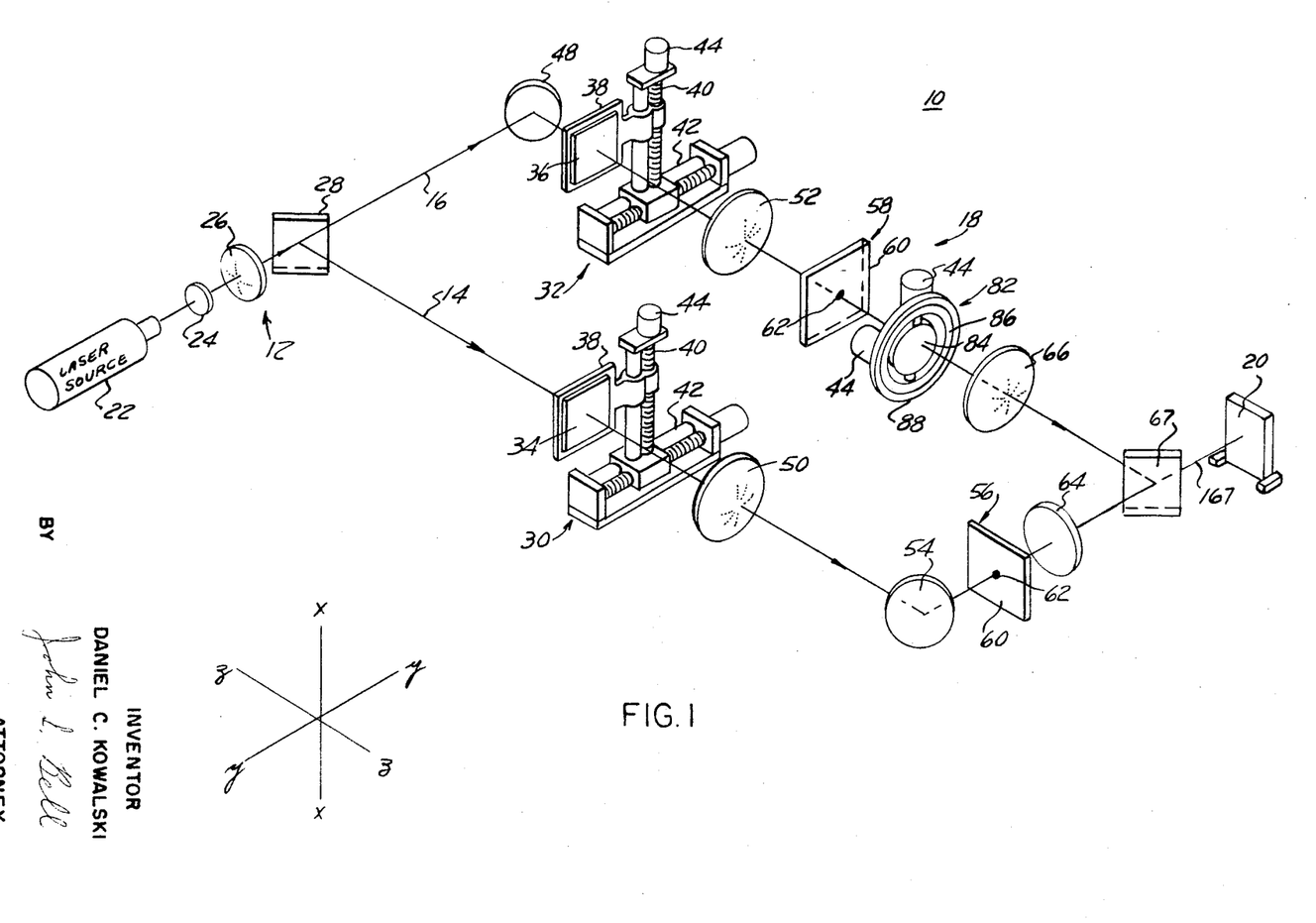
FIG. 1 is a perspective, schmeatic view of one embodiment of the hypsocline generating apparatus of this invention.

FIG. 1 illustrates a hypsocline generator 10 having apparatus 12 for projecting two collimated beams 14 and 16 of mutually coherent laser light, interferometric apparatus 18 for receiving those beams amd providing an interference pattern having an outline and position corresponding to a perspective representation of the outline and position of the entire area of a scene at one selected elevation. The interference pattern is projected onto a display screen 20.

The apparatus 12 for generating collimated beams of mutually coherent laser light is conventional and comprises a laser source 22 which produces a thin laser beam. That beam is expanded by an objective lens 24 and collimated by a collimating lens 26. A cube beam splitter 28 receives the laser light from lens 28 and provides the two collimated beams 14 and 16.

The interferometric apparatus 18 for receiving those beams and providing an output interference pattern comprises two identical photocarriages 30 and 32 which hold phototransparent stereo images 34 and 36, respectively. Each photocarriage includes a mounting plate 38 for holding a stereo image. The mounting plate 38 is attached to an X axis screw 40, which is in turn mounted to a Y axis screw 42. These screws are driven by motive means 44 such as servo motors or handwheels which thus move the stereo images 34 and 36.

Figure 2:
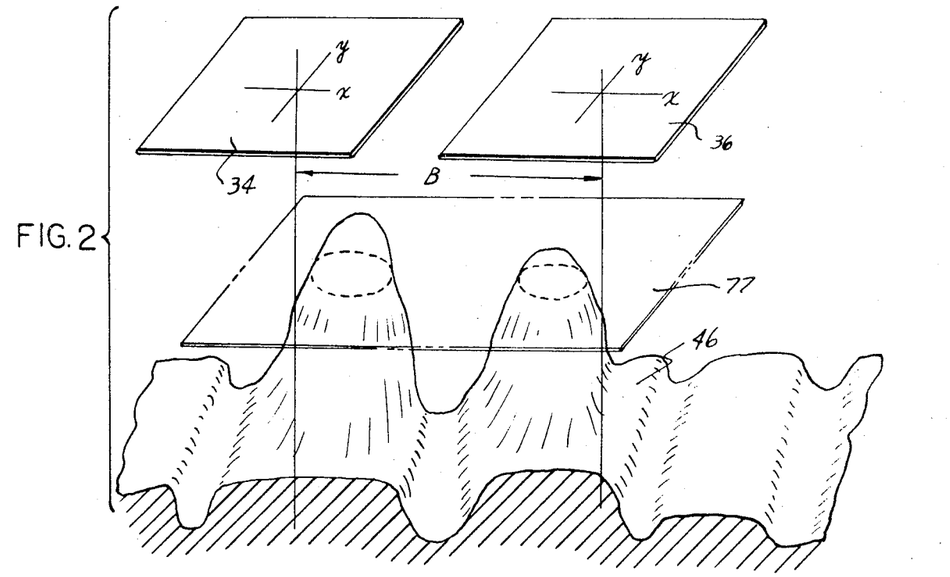
FIG. 2 is a perspective view of a scene that illustrates the relationship between that scene and two stereo images of that scene.

As is illustrated in FIG. 2, the stereo images 34 and 36 comprise photographs of a scene 46 taken from two different vantage points. The illustrated scene 46 is a land mass, but it is understood that the invention may be used to measure and determine elevations of various portions of any scene or object including such things as models of machine tools. The photographs 34 and 36 are separated by a distance B in FIG. 2. This distance is commonly called the base of the stereo image pair. The X and Y image coordinates of the stereo images 34 and 36 are commonly defined to be parallel to and perpendicular to the base line, respectively. This convention is followed herein. The stereo images 34 and 36 are mounted in the mounting plates 38 of the photocarriages 30 and 32 so that the X and Y axes of the two stereo images are parallel to each other. To simplify notation in the explanation of this embodiment, the stereo images 34 and 36 are mounted so that the X axes of those stereo images are parallel to the X axis of the hypsocline generator 10.

Collimated laser beam 14 illuminates image 34, and a mirror 48 directs beam 16 to illuminate image 36. Beams 14 and 16 have sufficiently large diameters so that they illuminate substantially the entire area of images 34 and 36. Stereo images 34 and 36 diffract the laser beam striking those images and thus transmit image information to those beams. All images have a D.C. spatial frequency component. The D.C. component does not carry any image detail information, but instead provides equal intensity contribution to all portions of the image. This component thus obscures any image pattern produced representing an isoelevation area. The interferometric apparatus 18 thus includes means for eliminating the D.C. spatial frequency component from the modulated beams 14 and 16 representing the stereo images 34 and 36. This means includes two spherical lenses 50 and 52 that are positioned to receive the diffracted beams 14 and 16, and to form the Fourier transforms of those diffracted beams. In other words, lenses 50 and 52 order the individual light rays comprising the diffracted beams 14 and 16 according to the angle of arrival of each ray at the lens, and thereby spatially separate the spatial frequency image components of the stereo images 34 and 36. The Fourier transformed beam 14 is directed by a mirror 54 to strike a spatial filter 56, and Fourier transformed beam 16 strikes a second spatial filter 58. Each spatial filter comprises a transparent glass piece 60 having an opaque disc 62 positioned to block the propagation of the D.C. spatial frequency components of the Fourier transformed beams to thereby eliminate those components from the beams. Two spherical lenses 64 and 66 are positioned downstream from the spatial frequency filters 56 and 58 respectively to remove the spatial separation between the remaining spatial frequency components of the beams 14 and 16, respectively. These lenses form second Fourier transforms of those beams. The spatial distribution of each spatial frequency component remaining in these beams is thus the same downstream from lenses 64 and 66 as it was upstream from lenses 50 and 52.

Figure 3:
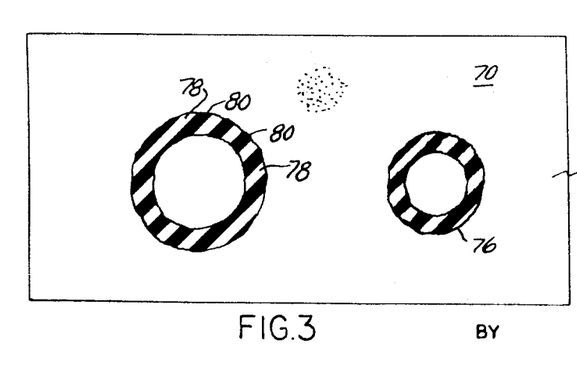
FIG. 3 illustrates an interference pattern that is provided by the apparatus of FIG. 1 and that represents the area at one elevation in the scene of FIG. 2.

The beams 14 and 16 intersect proximate a cube beam splitter 67 which superimposes the two beams and projects them along direction 167 to display screen 20 and provides an output image 68 such as that shown in FIG. 3 on that screen. This output image 68 comprises a gray background or noise signal 70 surrounding an interference pattern 72 having two parts 74 and 76. An interference pattern such as the pattern 72 is produced by any portions of the intersecting beams 14 and 16 that represent the same areas in the scene 46 and that are in registration with each other. The portions of the beams 14 and 16 representing all other areas of the scene produce the background signal 70. The portions of the beams 14 and 16 representing the same areas in the scene 46 will be aligned when the portions of the stereo images 34 and 36 representing those same areas in the scene are placed in the same corresponding positions relative to the center of the beams 14 and 16. The stereo images 34 and 36 are positioned with respect to the beams 14 and 16 so that the intersecting beams provide an interference pattern 76 representing the entire area in a scene 46 at one elevation 77.

The interference pattern 72 comprises alternate light and dark lines or interference fringes 78 and 80. The spacing between the fringes, or in other words the width of those fringes, can be adjusted iwth an optical flat mechanism 82. The mechanism 82 is positioned to receive the Fourier transformed beam 16 having spatially separated spatial frequency components and to deflect that received beam. The deflection of the Fourier transformed beam 16 alters the relative spatial distribution of the spatial frequency components of beam 16. Because of this deflection, the phase of beam 16 downstream from lens 66 will be slightly different from the phase of that beam upstream from lens 52. The phase relationship between the intersecting beams 14 and 16 can thus be changed by adjusting the optical flat mechanism 82. This phase change alters the spatial frequency of the interference pattern 74, or in other words alters the width of the individual fringes forming that pattern. It is possible to provide interference fringes of such a large width that the entire pattern is either completely dark or completely light. The apparatus 82 includes a transparent piece of glass or optical flat 84 which transmits received light but also deflects the transmitted light by an amount depending on the angle between the optical flat 84 and the beam 16 striking that flat. Optical flat 84 is mounted in a ring-shaped inner housing 86 which is in turn mounted in a ring-shaped outer housing 88. The inner housing is mounted so that it can be rotated about the Y axis of the system 10. The optical flat 84 is mounted so that it can be rotated with respect to the inner housing about the X axis of the system 10. The position of optical flat 84 can thus be adjusted to provide any desired spacing between the interference fringes of the pattern 74.

In operation, two stereo images 34 and 36 of a scene are mounted in the mounting plates 38 of the photocarriages 30 and 32, respectively. The stereo images may be mounted in any manner as long as their coordinates are substantially parallel. For illustration, they are mounted so that the X axes of the stereo images are parallel to the X axis of the hypsocline generator 10. The stereo images 34 and 36 are then aligned along the Y direction. That is, the stereo images are positioned so that the portions of beam 14 representing opposite sides along the Y axis of image 34 will be superimposed on and aligned with the portions of beam 16 representing the opposite Y axis sides of stereo image 36. The Y axis alignment of the stereo images is a preliminary orientation process. Once the stereo images are aligned, there is no need for any further movement along the Y axis. Collimated beams 14 and 16 ave sufficient width to illuminate the entire areas of stereo images 34 and 36 simultaneously. The intersecting beams produce an interference pattern on screen 20 representing the entire area in the scene at one elevation. The particular elevation represented is determined by the X axis orientation of the stereo images. Different output patterns representing the areas in the scene 46 at different elevations are produced by providing a relative movement between the stereo images 34 and 36 along the X axis of the system 10. This is accomplished for example by holding image 36 in a fixed position and moving image 34 along the X axis of the system 10. An output pattern representing an area of the scene at a higher elevation is provided by moving stereo image 34 in the minus X direction. The minus X direction is the direction that stereo image 34 would be moved when oriented as illustrated in FIG. 2 in order to decrease the base B. Similarly, an output pattern representing an area at a lower elevation is provided by moving stereo image in the plus X direction, or in other words the direction that would increase the base B illustrated in FIG. 2. Output interference patterns having an outline corresponding to the outline of the area of a scene at any particular elevation can thus be readily produced by moving one of the stereo images along the X axis of the system 10. The position of the interference patterns representing various areas in the scene correspond to the positions of the represented areas. The output patterns provided by the system 10 thus indicate both the shape and position of areas at a particular elevation. The spatial frequency at the output pattern, or in other words the width of the interference fringes, can be adjusted to provide interference patterns having a maximum amount of contrast with the background signal by tilting the optical flat 84.

The output interference patterns provided by the embodiment of FIG. 1 are perspective representations of the areas at various elevations in the scene. FIG. 2 illustrates a second hypsocline generator 90 illustrated in FIG. 1 in that it includes a zoom lens system 92 for converting perspective representations of isoelevation areas to orthographic representations of those areas. The intersecting beams superimpose upon each other are are both projected by the beam splitter 67 along direction 167. Since the two beams are superimposed on each other, the separation between the spatial frequency components of those beams can be eliminated by a single spherical lens 98 positioned downstream from the beam splitter 94 to form a Fourier transform of the superimposed beams. The two spherical lenses 64 and 66 of the system 10 are thus replaced by the single spherical lens 98. Lens 98 forms images such as image 68 illustrated in FIG. 3. The images produced by lens 98 define a plane 100. Lens 98 is positioned such that the image plane 100 is an appropriate distance from the input to the zoom lens system 92 so that the zoom lens system is capable of receiving and magnifying or minifying the interference patterns produced. Image 100 is reflected onto the input of the zoom lens system 92 by a mirror 101. This mirror is included in the system to make hypsocline generator 90 more compact. The zoom lens system comprises an array of lenses 102 and a motor apparatus 104 for changing the spacing between the various lenses to thereby alter the degree of magnification or minification provided by the lens array. The zoom lens system 92 is not shown in detail because these systems are well known and are described in a number of placed including Kingslake, R., "The Development of the Zoom Lens," *Journal of the SMPTE*, Vol. 69, August 1960, pp. 534-544.

Figure 5:
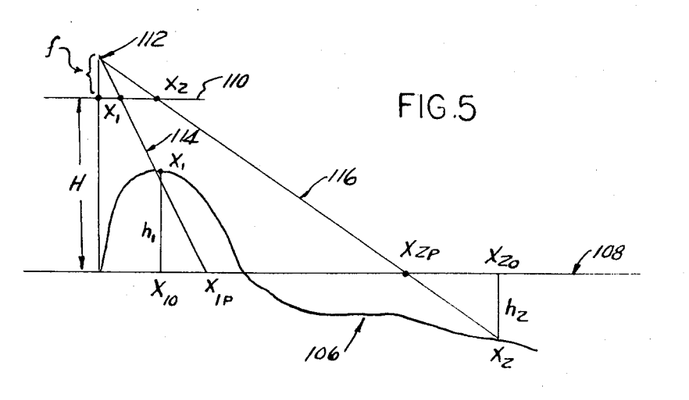
FIG. 5 illustrates the operation of the magnifying apparatus of the system of FIG. 4.

The manner in which the zoom lens system 92 operates is illustrated by FIG. 5, which demonstrates the differences between the various positions at which points in a scene appear in a perspective view of that scene and in an orthographic view of that scene. FIG. 5 comprises a scene 106 having portions both above and below an arbitrarily selected reference plane 108. The positions at which points $X_1$ and $X_2$ in the scene 106 appear on a positive, perspective image 110 of that scene formed using a camera having a focal length $f$ positioned at point 112 are indicated by rays 114 and 116, which project from the reference point 112 through the points $X_1$ and $X_2$, respectively. The points $X_1$ and $X_2$ appear in a positive, perspective image of the scene 106 at the positions $X_{1p}$ and $X_{2p}$ respectively, or in other words at the positions at which rays 114 and 116 intersect the reference plane 108. In contrast, the points $X_1$ and $X_2$ appear at the positions $X_{1o}$ and $X_{2o}$ respectively in an orthographic image of the scene 106. That is, they appear at the positions defined by the perpendicular projections of those points onto the reference plane 108. As FIG. 5 illustrates, points in a scene at elevations higher than a reference elevation appear at a greater distance from the center of a perpsective image, or in other words from the normal projection of point 122 onto image 110 and reference plane 108, than they do from the center of an orthographic image of the scene. Conversely, points in the scene at elevations lower than the reference elevation appear closer to the center of a perspective image than they do from the center of an orthographic image of the scene. The zoom lens mechanism 92 thus converts each interference pattern which is a perspective representation of an isoelevation area in a scene to an orthographic representation of the area by multiplying all patterns representing areas at elevations higher than an arbitrarily selected reference elevation by a factor proportional to the difference between the higher elevation and the reference elevation, and by minifying all patterns representing areas having elevations less than the reference elevations by a factor proportional to the difference between the lesser elevation and the reference elevation. Expressed mathematically, the zoom lens apparatus 92 multiplies each pattern by a factor of $(H + h_j)/H$ (1)

where:

$H =$ the distance between the plane of two positive, perspective, coplanar stereo images of a scene measured with respect to a selected reference elevation in the scene; and $h_j =$ the elevation of a point $j$ in the scene measured with respect to the selected reference elevation, which has a positive value for elevations greater than the reference elevation and a negative value for elevations lower than the reference elevation.

Interference patterns representing areas in the scene 46 at different elevations are obtained by providing a relative movement between stereo images 34 and 36 in a direction parallel to the X axis of those images. The relationship between relative movement of the stereo images and the elevations of areas represented by different patterns produced is provided by the mathematic expression:

$$\Delta p = Bf/H \ (h_j/H - hj)$$

(2)

where:

$\Delta p =$ relative X axis displacement of the stereo images;

$B =$ the base of the stereo images; and $f =$ the focal length of the camera for forming the stereo images.

The zoom lens system 92 thus multiplies each interference pattern representing an isoelevation area in the scene by a factor which is determined by the relative displacement of stereo images 34 and 36 required in order to provide that pattern. The displacement of images 34 and 36 is measured with respect to the positions of those two stereo images at which an interference pattern representing the area in the scene at a reference elevation is produced. This factor is expressed mathematically by solving equation 2 for $h_j$ and substituting the resulting expression into factor 1 to obtain:

$$1 + H\Delta p/(Bf + H\Delta p)$$

(3)

where: All symbols are as previously defined.

Figure 4:
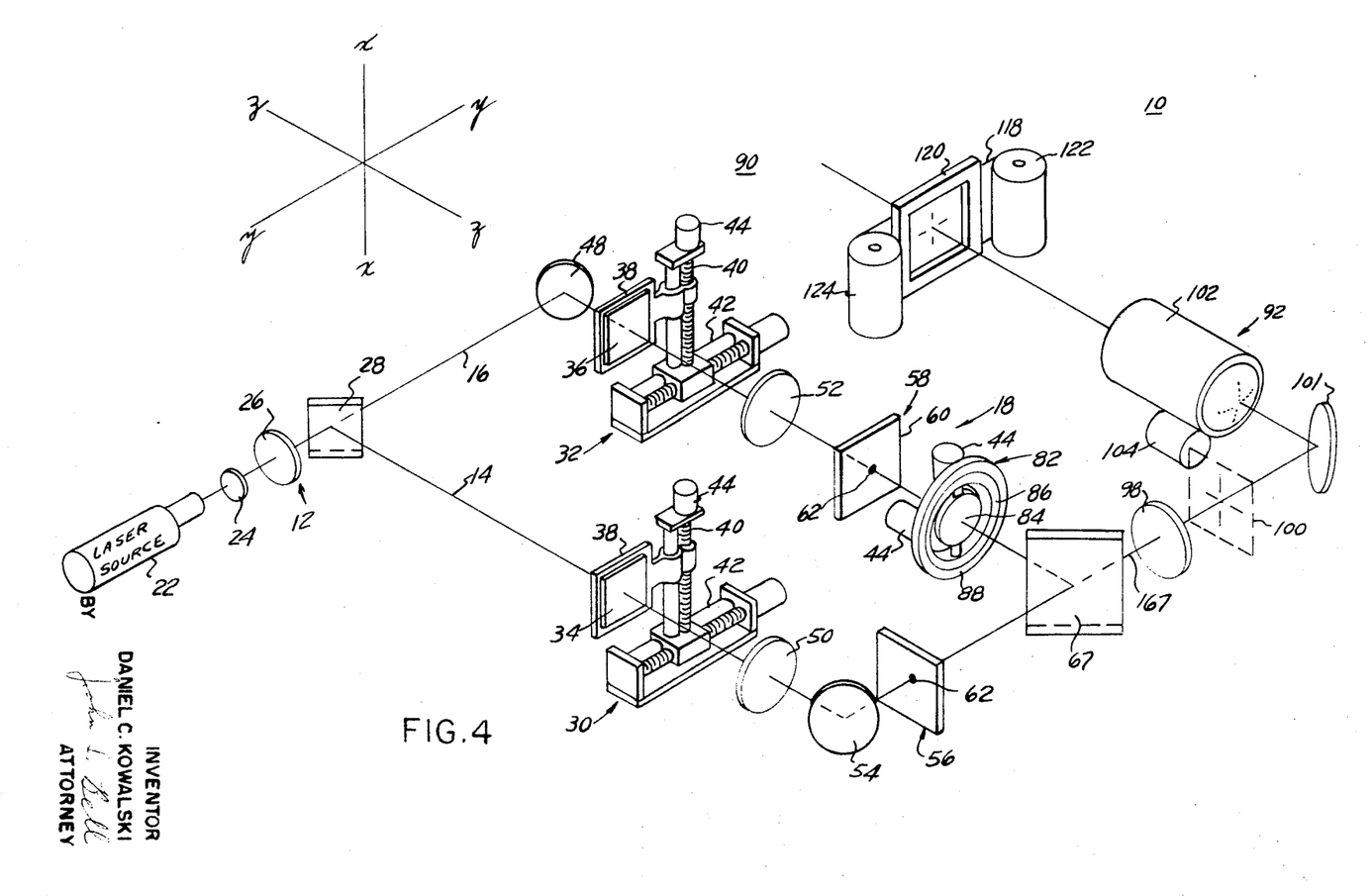
FIG. 4 illustrates a modified embodiment of the apparatus of FIG. 1 that includes magnifying apparatus for magnifying and minifying the patterns representing areas in a scene to provide orthographic representations of those areas.

The hypsocline generating system 90 also includes a recording film 118 for recording the various interference patterns produced. Each of the interference patterns produced by the system 90 is recorded on one frame of the film 118. The film is held by a film frame or holder 120 and is moved by a motor apparatus (not shown) from a first light-tight roller can 122 containing unexposed film to a second light-tight roller can 124 which contains the exposed film. The exposed film frames can be subsequently processed and superimposed upon each other to obtain an orthographic hypsocline map of the scene which indicates the relative elevation of all areas in that scene.

Figure 6:
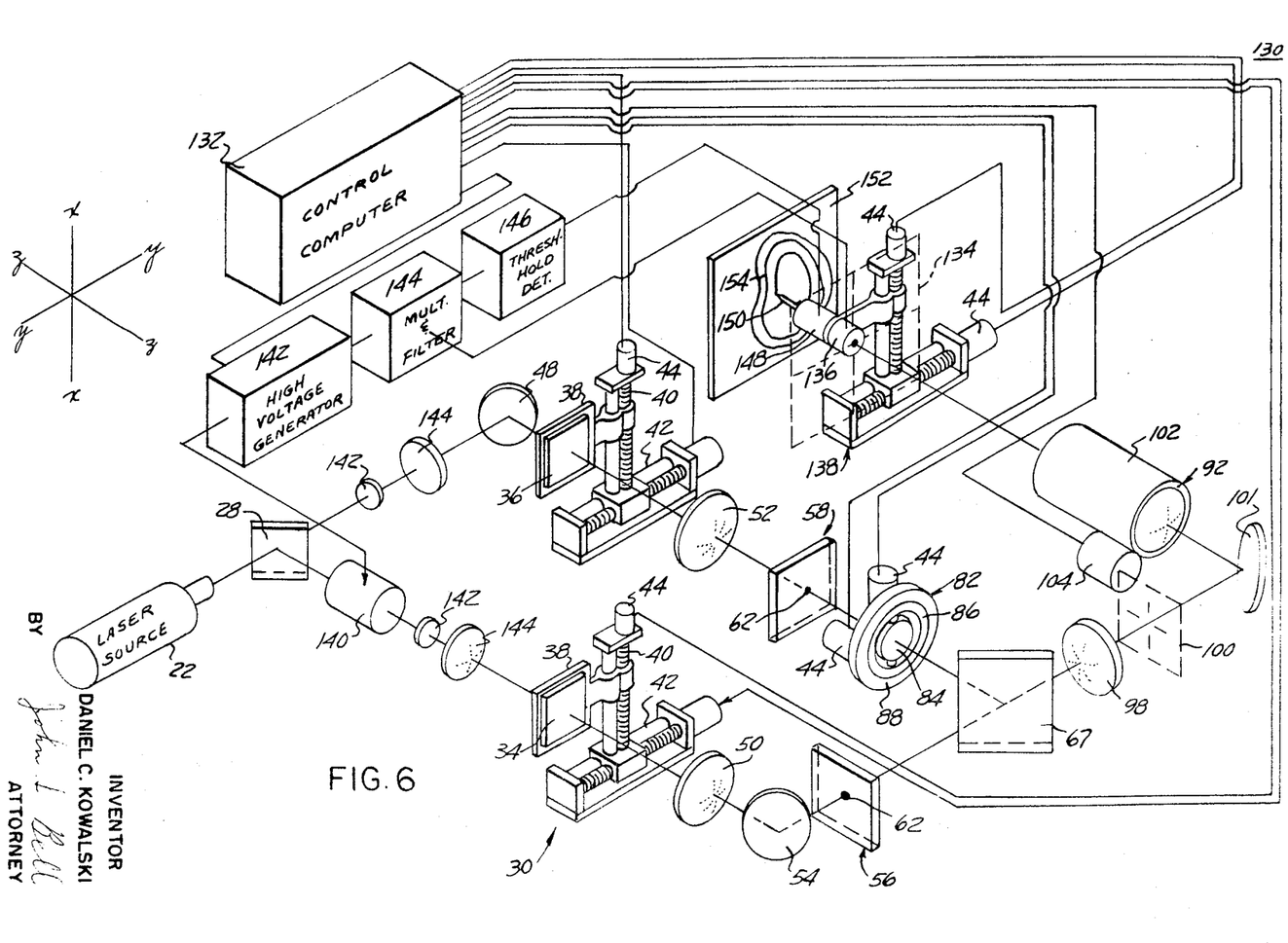
FIG. 6 illustrates a modified embodiment of the apparatus of FIG. 1 having means for automatically providing a permanent record or map indicating the elevation of all areas in a scene.

FIG. 6 illustrates a hypsocline generating system 130 that differs from the systems 10 and 90 in that it includes a computer controlled apparatus for automatically providing a permanent record of the area at each elevation of the scene represented by the stereo images 34 and 36. A computer control 132 controls the operation of motors 44 and thus controls the position of the stereo images 34 and 36. Computer control 132 also controls operation of motor 104 and thereby controls the magnification and minification provided by zoom lens array 102. The zoom lens array 102 provides output images which define a plane 134. A photoelectric detector 136 for receiving optic input signals and converting those signals to electric output signals is scanned across plane 134. The apparatus for scanning detector 136 across plane 134 comprises a computer controlled carriage 138 which is similar to the photocarriages 30 and 32 holding stereo images 34 and 36. Signals are transmitted from the computer control 132 to the motors 44 of carriage 138 which cause the photodetector 136 to be scanned across plane 134.

In order to provide output interference patterns representing areas at various elevations in a scene that can be recognized and distinguished from the background signals surrounding that interference pattern by the photodetector 136 and the associated signal processing apparatus, the system 130 includes a retardation type laser light modulator 140 for periodically eliminating the coherence between beams 14 and 16. Source 22 provides a beam of polarized laser light. modulator 140 eliminates the coherence between beams 14 and 16 by rotating the polarity direction of beam 14 at a predetermined frequency. Since beams 14 and 16 are produced by the same source, they are polarized in the same direction. When the direction of polarization of beam 14 is rotated by modulator 140, the coherence between the two beams is destroyed so that they will no longer provide an interference pattern. Modulator 140 has no effect on the gray background signals surrounding an interference pattern. The periodic rotation of beam 14 thus causes the interference pattern in plane 134 representing an isoelevation area in the scene to flash on and off. Commercially available modulators such as modulator 140 are capable of receiving only a narrow laser beam. Therefore, to accommodate this limitation of the modulator, the objective and collimating lenses 24 and 26 of the systems 10 and 90 are replaced by separate objective and collimating lenses 142 and 144, respectively, placed in each of the beams 14 and 16. Modulator 140 thus receives beam 14 before that beam is collimated.

A high voltage A.C. electric signal for driving modulator 140 is provided by a high voltage signal generator 142. Modulator 140 rotates the polarity of beam 14 at a frequency equal to the frequency of the high voltage A.C. signal provided by generator 142 and thus causes the interference pattern produced in plane 134 to flash on and off at the frequency of this A.C. signal. The signal from generator 142 is also transmitted to an electronic multiplier and filter apparatus 144. Apparatus 144 also receives the electric output signal from photodetector 136. Apparatus 144 compares the signal received from voltage generator 142 and photodetector 136 provides an output signal whose value is proportional to the correlation between the frequencies of the two received signals. The output from apparatus 144 is transmitted to a threshold detector 146 which in turn provides an output to a motor 148 whenever a signal is received from apparatus 144 having a value greater than a predetermined value computed by the control computer 132. The tracing motor 148 causes that motor to extend a tracing pencil 150 to strike a tracing surface 152 and thus trace along that surface whenever photodetector 136 receives a signal oscillating at the frequency of the signal provided by high-voltage generator 142 and is thus aligned with an interference pattern representing an isoelevation area in the scene. Motor 148 retracts tracing pencil 150 from surface 152 whenever photodetector 136 is spaced from such an interference pattern and thus receives only background signals. Tracing motor 148 and pencil 150 are mounted to move with detector 136 and thereby provide a record of the positions at which a flashing interference pattern is detected.

In operation, stereo images 34 and 36 are sequentially positioned to provide output images representing the area at each elevation in the scene. Detector 136 is scanned across each sequentially provided output image. Tracing pencil 150 provides a trace of the position of detector 136 whenever that detector is aligned with an interference pattern representing an isoelevation area, and thereby provides a map 154 indicating the contour of the scene represented by stereo images 34 and 36.

Having thus described several embodimens of this invention, a number of modifications will occur to those skilled in the art.

Therefore, what is claimed is:

1. An interferometric method for determining the outline and position of the entire area of a scene at one elevation from substantially coplanar first and second stereo images representing the scene from first and second vantage points respectively, each image having a first axis parallel to a straight line connection between the vantage points, the method comprising the steps of:
    positioning the stereo images with the first axes substantially parallel to each other;
    forming first and second wave energy signals that represent said positioned first and second stereo images respectively, and that interfere when superimposed on each other;
    superimposing said first and second signals, the positioning of said stereo images with said first axes parallel to each other causing the portions of said superimposed signals representing the entire area of the scene at one elevation ot register with each otehr and provide a readily recognizable interference signal representing the outline and position of said area at said one elevation.

2. The method of claim 1 in which:
    the particular elevation represented by the interference signal is determined by image position along a dimension parallel to said first axes; and
    the method further includes the step of providing a relative movement between said first and second signals along a dimension corresponding to the dimension of said substantially parallel first axes to sequentially bring the portions of said signals representing areas of said scene at different elevations into registration with each other and thereby provide different interference signals representing the outlines and positions of areas at different elevations.

3. The method of claim 1 in which:
said first and second wave energy signals each have a D.C. spatial frequency component; and
the method further includes the step of removing said D.C. spatial frequency components from said first and second signals.

4. The method of claim 1 further including the step of adjusting the spatial frequency of said interference signal to facilitate recognition of said interference signal.

5. The method of claim 4 wherein:
said first and second wave energy signals comprise first and second mutually coherent beams of laser light modulated to represent said first and second stereo images respectively;
said interference signal comprises an optic pattern of alternate light and dark lines; and
said adjusting of the spatial frequency of said interference pattern comprises altering the width of said lines.

6. The method of claim 1 further including the step pf periodically altering said interference signal to facilitate recognition of said interference signal.

7. The method of claim 6 in which said altering comprises causing said interference signal to flash on and off.

8. The method of claim 2 in which:
said interference signals comprise optic patterns that define perpsective representations of isoelevation areas of said scene; and
the method further includes the step of converting said perspective representations to orthographic representations.

9. The method of claim 8 in which said converting comprises magnifying all output patterns representing areas in said scene having an elevation less than a preselected elevation by amounts proportional to the differences between said lesser elevations and said preselected elevation, and demagnifying all output patterns representing areas in said scene having elevations greater than said preselected elevation by amounts proportional to the differences between said greater elevations and said preselected elevation to thereby provide said orthographic representation.

10. The method of claim 1 further including the step of providing a permanent record of the outline and position of said area at one elevation.

11. The method of claim 1 in which said forming of said first and second signals comprises:
directing first and second beams of mutually coherent, collimated radiation to strike and be modulated by said first and second stereo images respectively; and
the method further includes the steps of:
forming the Fourier transform of said modulated first and second beams to thereby spatially separate the spatial frequency image components of said first and second modulated beams;
eliminating the D.C. spatial frequency components from said Fourier transformed first and second beams; and
forming a second Fourier transform of the remaining components of said modulated beams to thereby eliminate said spatial separation, said second Fourier transform providing output beams in which the pattern of each spatial frequency components of said output beams is identical to the pattern of said each spatial frequency components of said two stereo images.

12. An interferometric system for determining the outline and position of the entire area of a scene at one elevation from two substantially coplanar stereo images representing the scene from different vantage points, said images each having a first axis parallel to a straight line connection between the vantage points, said system comprising:
image holding means for holding the two stereo images in a spaced apart relationship with the first axes of said images substantially parallel to each other;
first beam directing means for directing a first beam of coherent radiation to strike and be modulated by one of said stereo images;
second beam directing means for directing a second beam of radiation mutually coherent with said first beam to strike and be modulated by the other of said stereo images and then intersect said modulated first beam, the holding of said images with said first axes parallel to each other causing the portions of said intersecting beams representing the entire area of said scene at one elevation to register with each other and provide an interference pattern having an outline and position representing the outline and position of said area at said one elevation.

13. The system of claim 12 in which:
the particular elevation represented by the interfering portions of said beams depends on the relative positions of said stereo images along a dimension parallel to said first axes; and
said image holding means include means for moving one image with respect to the other along said dimension to change the portions of said beams in registration with each other and thereby provide different patterns representing different elevations.

14. The system of claim 13 wherein:
said first and second beams are mutually coherent beams of laser light;
said stereo images are partially transparent images that modulate received laser light by diffraction;
said interference pattern comprises a hypscoline; and
said second beam directing means includes means for directing said second beam to strike said other stereo image along a path that does not intersect the modulated first beam and means for deflecting the modulated second beam to intersect the modulated first beam.

15. The system of claim 12 further including means for eliminating at least one preselected spatial frequency component representing at least one preselected degree of image detail from said first and second modulated beams.

16. The system of claim 15 in which said spatial frequency eliminating means comprises means for eliminating the D.C. spatial frequency component from said first and second modulated beams.

17. The system of claim 15 in which said spatial frequency eliminating means comprises:

means for spatially separating the spatial frequency image components of said first and second modulated beams representing different degrees of image detail;

spatial filter means for eliminating one of said separated spatial frequency components from said first and second modulated beams; and means for eliminating said spatial separation between the remaining spatial frequency components of said modulated beams to thereby provide a distribution of image information corresponding to the distribution of image information on said two stereo images.

18. The system of claim 17 in which:

said means for spatially separating image components comprises means for forming the Fourier transform of said first and second modulated beams; and said means for eliminating said spatial separation comprises means for forming the Fourier transform of said Fourier transformed, modulated beams.

19. The system of claim 18 in which:

said stereo images are partially transparent and said modulation comprises diffraction of said first and second beams;

said beams are beams of mutually coherent beams of laser light;

said means for spatially separating image components comprises first lens means for forming the Fourier transform of said modulated first beam positioned between said first image and the position at which said beams intersect, and second lens means for forming the Fourier transform of said modulated second beam disposed between said second image and the position at which said beams intersect; and said means for eliminating said spatial separation comprise third lens means for forming the Fourier transform of said modulated first and second beams.

20. The system of claim 19 further including:

means for projecting said first and second Fourier transformed, modulated beams along substantially the same path; and said means for eliminating said spatial separation comprises a single spherical lens disposed to receive said Fourier transformed modulated beams from said projecting means.

21. The system of claim 12 in which said interference pattern comprises a cyclically varying intensity pattern, and said system includes means for altering the phase of said first beam with respect to said second beam to thereby alter the spatial frequency of said interference pattern.

22. The system of claim 21 in which:

said system includes means for forming the Fourier transform of said modulated first beam to spatially separate the spatial frequency components of modulated first beam;

said phase altering means comprises means for deflecting said Fourier transformed first beam to vary the spatial distribution of the spatial frequency components of said Fourier transformed first beam with respect to said second beam; and said system includes means for eliminating said spatial separation of said spatial frequency components of said first beam before said first beam intersects with said second beam.

23. The system of claim 13 in which:

said interference patterns comprise perspective representations of isoelevation areas; and said system includes magnifying means responsive to said relative movement between said one image and said first beam for magnifying each pattern produced by said system by a factor $1 + H\Delta p/(Bf+H\Delta p)$ to convert said perspective representation to an orthographic representation where:

$B$ = a constant equal to the distance between the two vantage points;

$f$ = focal length of a camera for providing the two stereo images;

$H$ = distance between the plane of said coplanar stereo images and a preselected elevation; and $\Delta p$ = displacement of said one stereo image along said dimension between the position at which a pattern representing the area at said preselected elevation is produced and the position at which said each pattern is produced.

24. The system of claim 12 in which:

said first and said second beams are polarized in substantially the same direction; and said system further includes means for rotating the polarity direction of said modulated first beam to periodically destroy said mutual coherence and thereby cause said patterns to flash on and off, said flashing facilitating recognition of said pattern.

25. The system of claim 24 further including means for providing a permanent record of the outline and position of said area at one elevation comprising:

detector means for receiving said pattern, said detector means providing an output signal indicating the temperal frequency of received radiation;

means for identifying the position at which signals having a frequency substantially equal to the temperal frequency at which the polarity direction of said first beam is changed from said polarity direction of said second beam; and recording means responsive to said position determining means for providing a record of said determined positions.

26. The system of claim 25 in which:

said first and second beams comprise beams of laser light;

said interference pattern defines a plane;

said detector means comprises a photoelectric detector device, and means for scanning said detector device across said plane along a predetermined raster pattern; and said position identifying means comprise means for identifying the position of said detector device in said plane.

* * * * *